April 22, 1952  A. R. TRIST  2,593,939
PACKING FOR ROTATING SHAFTS
Filed June 25, 1946  3 Sheets-Sheet 1

ARTHUR Ronald TRIST
INVENTOR
his ATTY.

April 22, 1952  A. R. TRIST  2,593,939
PACKING FOR ROTATING SHAFTS
Filed June 25, 1946  3 Sheets-Sheet 3
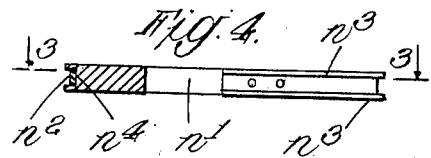
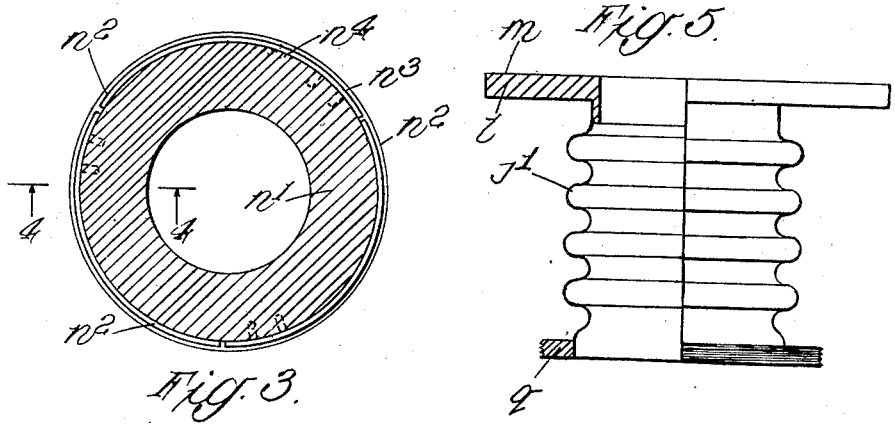
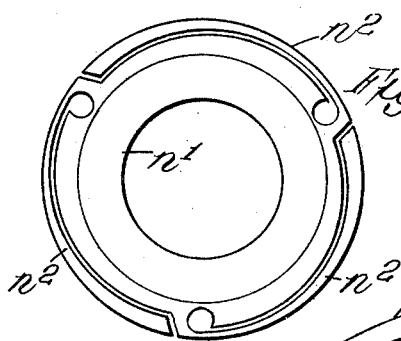
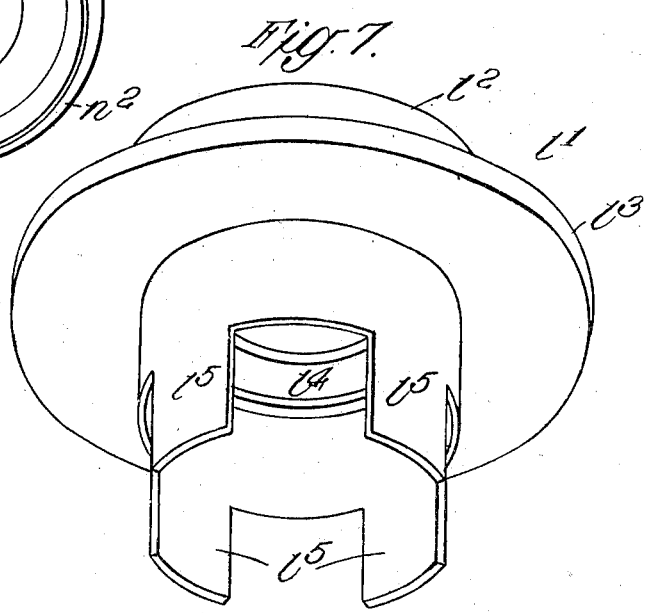
ARTHUR RONALD TRIST
INVENTOR Patented Apr. 22, 1952

2,593,939

UNITED STATES PATENT OFFICE 2,593,939

PACKING FOR ROTATING SHAFTS

Arthur Ronald Trist, Woking, England

Application June 25, 1946, Serial No. 679,183
In Great Britain July 3, 1945

8 Claims. (Cl. 286—9)

This invention relates to improvements in packings for rotating shafts and is suited for use with all kinds of machinery in which a shaft rotating at a comparatively high speed projects through a stuffing box to prevent the passage of liquid, such for example as the shaft of a steam turbine, the propeller shaft of a ship, the shaft of a high speed turbine type rotary pump and so on.

The principal object of the invention is to prevent leakage at the running joint and to provide means whereby the contact pressure between the moving surfaces as well as the relative speed of such surfaces can be definitely controlled.

Another object of the invention is to provide means that will reduce wear, minimise friction and provide ample lubrication for all running surfaces thereby producing a more efficient packing for the purpose specified than has been possible in the past.

The invention contemplates a unit that can be mounted on the machine casing to embrace the shaft just beyond the superseded stuffing box.

This invention consists in a packing for rotating shafts comprising a pressure barrier exposed at its outer end to deleterious liquid to be restrained and at its inner end to lubricating liquid, flat co-operating surfaces of which one is mounted on said shaft and one is maintained stationary, a longitudinally extendible chamber connected to the stationary flat surface, elastic means for controlling the pressure acting on said surfaces and means for feeding lubricating liquid to the interior of said chamber at a pressure that is automatically maintained in excess of the pressure of the liquid to be restrained.

Although in practice a variety of mechanically equivalent constructions and arrangements can be employed, in order that the nature of the invention may be the better understood, examples thereof will now be described in relation to the accompanying drawings, reference being had to the several figures shown and to the letters thereon, like letters referring to similar or equivalent parts in the different figures in which:

Figure 3 is a plan of one of the centrifugally controlled friction rings in section taken on the line 3—3 of Figure 4;

Figure 4 is an elevation of Figure 3 partly in section taken on the line 4—4 of Figure 3;

Figure 5 is a detail view, partly in section, showing an alternative form of longitudinally extendible member;

Figure 6 is a detail plan view of a modified centrifugally controlled friction ring; and Figure 7 is an isometric view of a detail.

Figure 1:
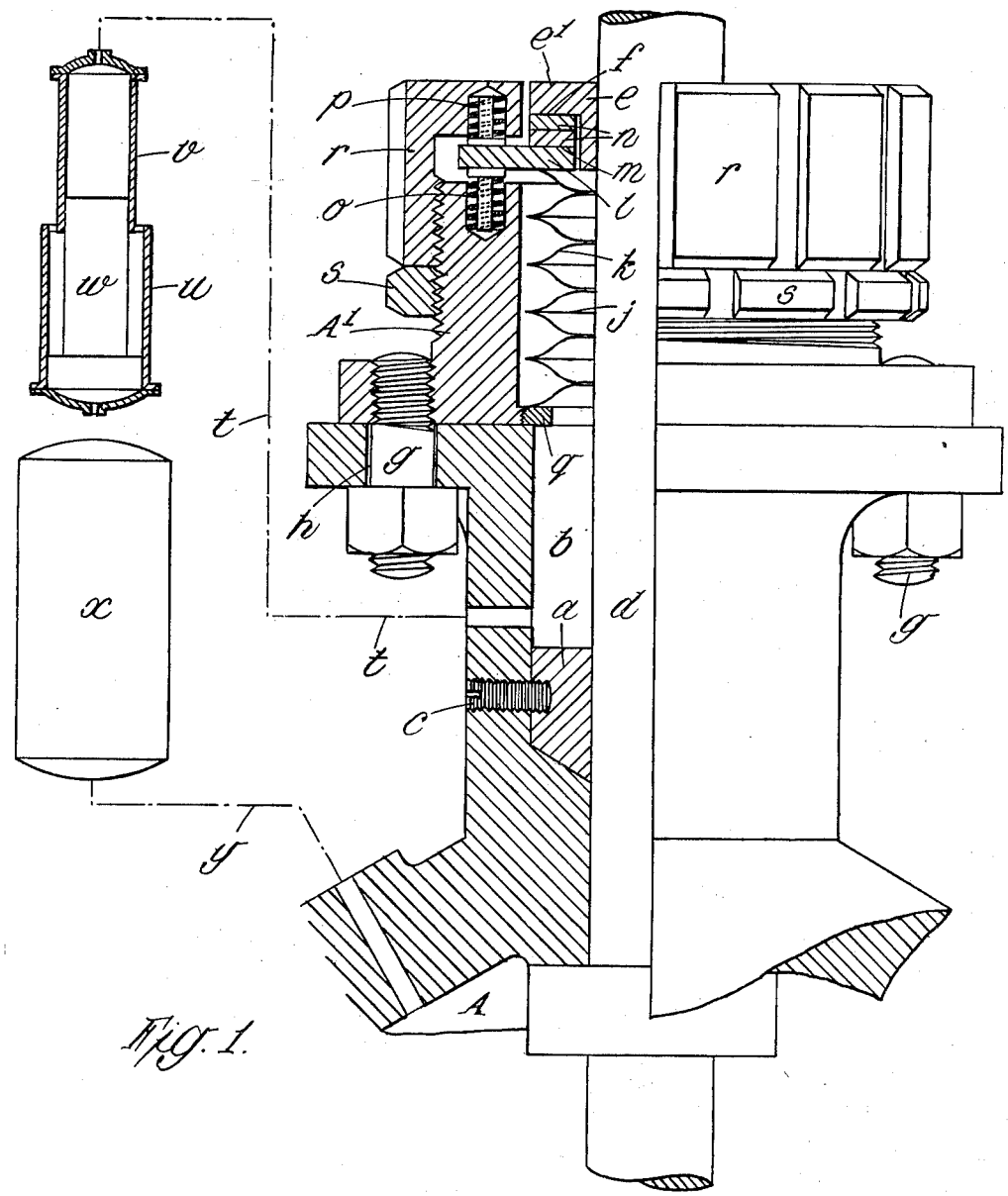
Figure 1 shows one schematic arrangement with parts in sectional elevation.

For the purpose of description, the arrangement shown in Figure 1 illustrates the application of the invention to the high speed shaft of a turbine type rotary pump handling a liquid that has such deleterious properties that it has to be excluded from the stuffing box.

It is assumed that the improved packing is to be substituted for the usual stuffing box and gland and to that end the usual packing material and gland are removed so that the new structure may be secured to the flange usually provided on the pump casing A.

As shown in Figure 1, a pressure barrier in the form of a neck ring $a$ of anti-friction metal is installed in the bottom of the packing space $b$ adjacent to the bearing $a^1$ of the casing A, said ring being secured in place, for instance by screws such as $c$, and being a close running fit on the shaft $d$ of the pump.

The part of the shaft $d$ that projects beyond the packing space $b$ of the casing A has a flanged liner $e$ fixed thereon and jointed thereto in a pressure-tight manner, the flat under surface $f$ of the flange $e^1$ that is the side facing the casing A, being smoothed and polished as may be necessary to present a running surface joint with a similarly smoothed and polished flat surface.

The casing A is extended by a tubular element $A^1$ that is secured in place in a pressure-tight manner by studs $g$ inserted through the holes $h$ for the original gland bolts now removed, said element $A^1$ enclosing a longitudinally extendible member.

As shown in Figure 1, the longitudinally extendible member consists of a plurality of dished washer-like parts $k$ arranged back-to-back and alternately connected to one another by the outer and inner peripheries to form a bellows $j$ or concertina arrangement, alternatively the longitudinally extendible member may consist of a corrugated tube $j^1$ as shown in Figure 5.

The lower end of the longitudinally extendible bellows $j$ is attached to a screwed bush $q$ mounted in the inside of the element $A^1$ in a pressure-tight manner whilst the upper end of the bellows $j$ is attached to an apertured disc $l$ also in a pressure-tight manner, the part $m$ of the flat upper surface of the disc $l$ being smoothed and polished to present a running surface joint with a similarly smoothed and polished flat surface.

In some constructions the flat surface $f$ of the flange $e^1$ directly co-operates with the flat surface $m$ of the disc $l$ but usually, and as shown in Figure 1, it is desirable to modify the relative velocity and the friction between the surfaces $f$ and $m$ by introducing friction rings, such as $n$, of even thickness and having smoothed and polished plane surfaces.

The surfaces $f$ and $m$, including the intermediate surfaces of the friction rings $n$ are pressed together by a plurality of springs $o$, of which one is shown in Figure 1, housed in the element $A^1$ and applied to the under side of the outer margin of the apertured disc $l$, elastic control of the pressure being provided for by the plurality of springs $p$, of which one is shown in Figure 1, applied to the upper side of the outer margin of the apertured disc $l$.

The springs $p$ are housed in the cap nut $r$ that is mounted on a screw thread cut on the exterior of the element $A^1$ and locked in place after adjustment by the capstan nut $s$.

This arrangement of springs enables the pressure between the surfaces $f$ and $m$, including the intermediate surfaces, to be adjusted delicately without positively restricting the movement of said surfaces along the longitudinal axis of the arrangement.

To prevent the admission of deleterious liquid to the interior of the bellows $j$ and to lubricate the surfaces $f$, $m$ and those of the rings $n$ intermediate thereto, a lubricating liquid is fed to the interior of the bellows $j$ through a pipe $t$ under a pressure that is always proportionately greater than the pressure of the deleterious liquid so that there is always a small flow of lubricating liquid outwardly or a tendency for such a flow between the ring $a$ and the shaft $d$ that opposes the flow of deleterious liquid inwardly and at the same time there is a seepage of lubricating liquid between the surfaces $f$ and $m$ and those intermediate that conduces to mechanical efficiency.

The supply of lubricating liquid through the pipe $t$ under a pressure that is always proportionately greater than the pressure of the deleterious liquid being restrained is effected by differential hydraulic means which as shown in Figure 1 comprise two cylinders $u$ and $v$ having a pressuretight ram $w$ of different diameters.

The large cylinder $u$ is filled with a liquid immiscible with the deleterious liquid (usually with oil) and is connected to the upper part of a drum or tank $x$ (subject to the relative densities of the deleterious and immiscible liquids) also containing similar liquid (or oil) whilst the small cylinder $v$ is filled with lubricating liquid and is connected to the pipe $t$.

The lower part of the drum or tank $x$ is connected by the pipe $y$ to the casing $A$ so that the larger diameter of the ram $w$ is influenced by the pressure of the deleterious liquid in the casing $A$ through the oil in the drum $x$ that acts as an isolation column and causes the smaller diameter of the ram $w$ to express lubricating liquid through the pipe $t$ at a pressure that is always greater than the pressure of the deleterious liquid in the ratio of the diameters of the ram $w$.

Figure 2:
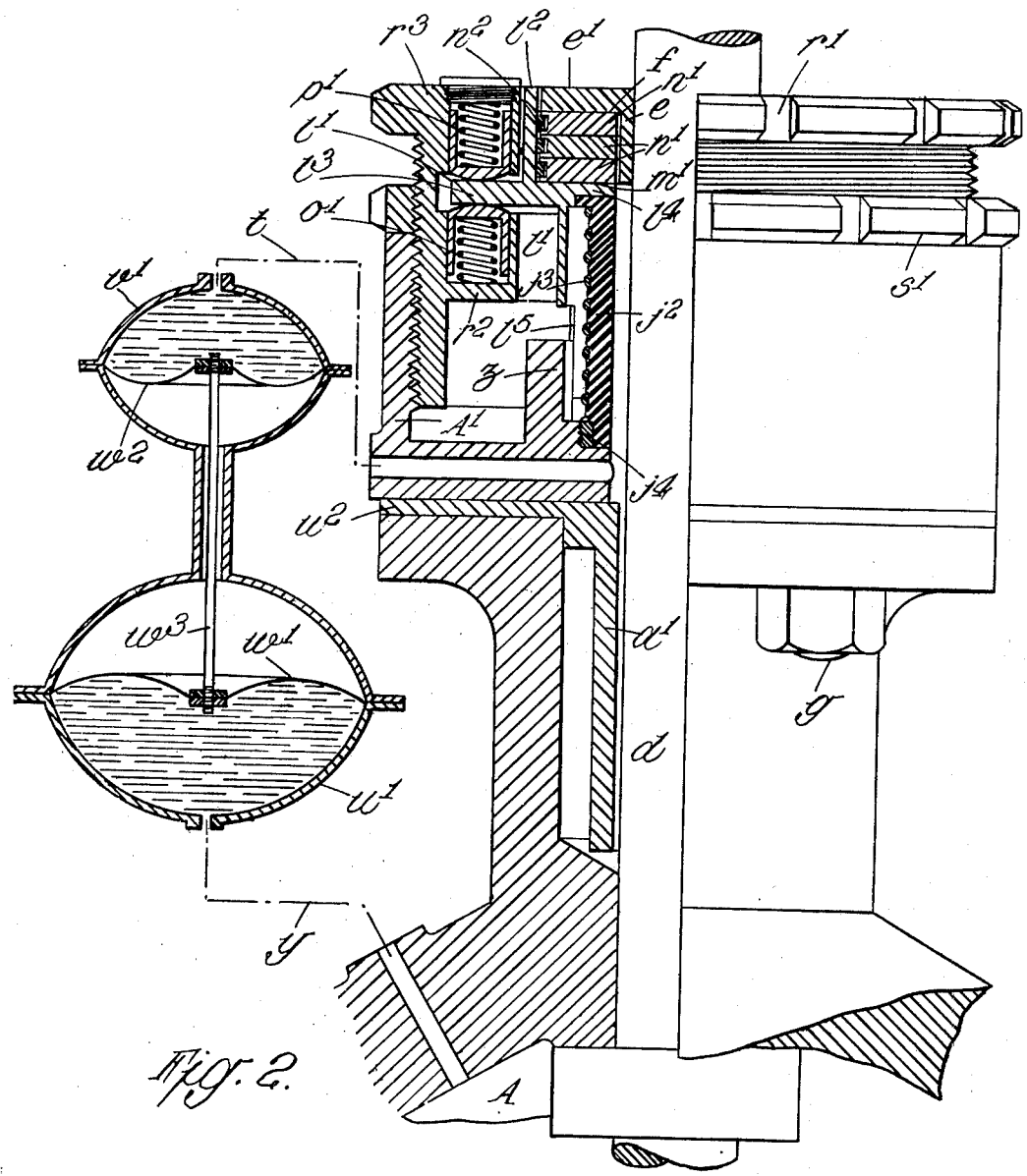
Figure 2 shows a modified schematic arrangement with parts in sectional elevation.

The modified arrangement shown in Figure 2 enables increased efficiency to be achieved in a simple way; in this arrangement the neck ring $a$ is replaced by a sleeve $a^1$ that is quite a loose fit on the shaft $d$ and is as long as can be accommodated in the packing space $b$ adjacent to the bearing $a^1$ of the casing $A$.

This sleeve $a^1$ is held in place by its flange $a^2$ that is clamped on the casing $A$ when the parts are assembled and need not be of metal as the purpose of the sleeve is to encourage and maintain without undue loss a long, thin continuous cylindrical film of the lubricating fluid fed through the pipe $t$.

As in Figure 1 the projecting part of the shaft $d$ has a liner $e$ with a flange $e^1$ and surface $f$ attached thereto and the casing $A$ has an internally flanged tubular element $A^1$ mounted thereon to enclose an extendible member, but in the arrangement shown in Figure 2 this extendible member is a tube or sleeve $j^2$ of india-rubber or other elastic material reinforced by an externally disposed spiral $j^3$ of metal wire of suitable cross section say, half round for example.

The lower end of the sleeve $j^2$ is attached to the internal flange of the element $A^1$ in a pressure-tight manner for example by means of a screwed metal bushing $j^4$ or otherwise and the upper end is connected to an annular member $l^1$ also in a pressure-tight manner.

The annular member $l^1$ comprises an upwardly extending cylindrical wall $l^2$, an outwardly extending flange $l^3$, an inwardly extending flange $l^4$ having a smoothed and polished upper surface $m^1$ and to the under side of which the sleeve $j^2$ is attached and a downwardly depending wall having spurs or guide bars $l^5$ that co-operate with internal projections $z$ on the flange of the element $A^1$ to prevent the member $l^1$ from rotating relatively to the element $A^1$.

In practice it is found that the performance of the friction rings $n$ between the surfaces $f$ and $m$ is unpredictable and in this modified arrangement means are provided to ensure that all the parts move at the correct velocity relatively to one another to obtain the best results.

To this end the periphery of each ring $n^1$ has a plurality of elastic cantilevers $n^2$ in the form of circularly curved spring blades each of which is attached to its ring $n^1$ for radial deflection under the action of centrifugal force, the outer part of each cantilever $n^2$ co-operating with the inner surface of the cylindrical wall $l^2$ when a critical speed is reached to restrain the speed of the friction ring below this critical value.

By this means it is easy to maintain a constant relative velocity between the surfaces intermediate of $f$ and $m^1$, for example, if the shaft $d$ is rotating at sixty revolutions a second and a relative velocity of fifteen revolutions per second is required then three friction rings $n^1$ must be used, the elastic cantilevers $n^2$ on the ring $n^1$ nearest to the surface $f$ being tuned or adjusted to co-operate with the wall $l^2$ when rotating at forty-five revolutions per second, the elastic cantilevers $n^2$ on the next ring $n^1$ being tuned or adjusted to co-operate with the wall $l^2$ when rotating at thirty revolutions per second and the elastic cantilevers $n^2$ on the ring $n^1$ nearest the stationary surface $m^1$ being tuned or adjusted to co-operate with the wall $l^2$ when rotating at fifteen revolutions per second.

The elastic cantilevers $n^2$ or circularly curved spring blades may be formed by cutting the margin of the friction ring $n^1$ as shown in Figure 6 or may be in the form of circularly curved strips of spring metal attached to the friction rings $n^1$ as shown in Figures 3 and 4 and in some cases the circularly curved strips may be shrouded between flanges $n^3$ obtained by turning a peripheral groove $n^4$ in the edge of the ring, thus enabling the surfaces of the running joint to be extended without increase in the overall dimensions of the arrangement.

A further modification shown in Figure 2 enables the surfaces $f$ and $m^1$ including the intermediate surfaces of the friction rings $n^1$ to be pressed together by elastic means of constant value regardless of the degree of adjustment by housing the plurality of springs $p^1$, of which one is shown in Figure 2, that press on the upper side of the outwardly extending flange $l^3$ as well as the plurality of springs $o^1$, of which one is shown in Figure 2, that press on the under side of the flange $l^3$ in the body of the adjusting screw $r^1$.

To enable this to be done the screw $r^1$ has an internal lower flange $r^2$ in which the springs $o^1$ are housed and an integral upper flange $r^3$ in which the springs $p^1$ are housed, the flange $l^3$ being disposed between the two pluralities of springs.

When a hydraulic augmenting device without a sliding ram, such as $w$ shown in Figure 1, is used, the isolation column can be omitted.

As shown in Figure 2, a hydraulic augmenting device is used that consists of a chamber $u^1$ divided by a flexible diaphragm $w^1$, of comparatively large diameter, coupled by a rod $w^3$ to a flexible diaphragm $w^2$, of smaller diameter, that divides a chamber $v^1$, the deleterious liquid from the casing A being admitted through the pipe $y$ to the under side of the diaphragm $w^1$ to express lubricating liquid from the upper side of the diaphragm $w^2$ through the pipe $t$ to the inside of the sleeve $j^2$ to fill the space between the sleeve $a^1$ and the shaft $d$ and to provide for the seepage past the surfaces of the rings $n^1$.

Hydraulic augmenting devices with diaphragms are of particular value when the pressure of the deleterious liquid is very low as happens for example when the invention is applied to the propeller shaft of a ship and the sea water only has the head due to the draught of the vessel.

When the liquid to be restrained has no deleterious properties so far as moving surfaces in contact is concerned, the pressure barrier may consist of flat surfaces (such as $f$ and $m$ or $m^1$) and friction rings (such as $n$ or $n^1$) elastically associated by a system of springs (such as $o$ and $p$ or $o^1$ and $p^1$) and fed with lubricating liquid at a pressure hydraulically augmented through a longitudinally extendible sleeve (such as $j$ or $j^1$ or $j^2$).

Although for the purpose of explanation in the description and drawings the thrust bearing has been associated with a pump packing, obviously the anti-friction rings carrying peripherally mounted centrifugally responsive speed limiting means may be used as a thrust bearing in machines of all kinds quite independently of pump packings.

I claim:

1. Packing means for restraining the flow of liquid along the journal of a rotating shaft comprising a flat-surfaced rigid flange mounted on the shaft, a longitudinally extendible chamber surrounding the shaft, stationary anchoring means for one end of the chamber, a flat-surfaced rigid apertured disc mounted on the free end of the chamber with its flat rigid surface disposed adjacent to the flat rigid surface on the flange, anti-friction rings with flat parallel rigid surfaces disposed between the flat rigid surface on the chamber and the flat rigid surface on the flange to seal one end of the chamber, centrifugally responsive means on the periphery of each anti-friction ring to limit the speed of rotation of the ring, first spring means for pressing the flat rigid surfaces together, second spring means for pressing the flat rigid surfaces apart, a fluid pressure barrier surrounding the shaft adjacent to the stationary anchoring means to seal the other end of the chamber, means for feeding lubricating liquid to the interior of the extendible chamber at a pressure that is automatically maintained in excess of the pressure of the liquid to be restrained, and a stationary casing for supporting the barrier, the anchoring means, the first spring means and the second spring means.

2. Packing means for restraining the flow of liquid along the journal of a rotating shaft comprising a flat-surfaced rigid flange mounted on the shaft, a longitudinally extendible chamber surrounding the shaft, stationary anchoring means for one end of the chamber, a flat-surfaced rigid apertured disc mounted on the free end of the chamber with its flat rigid surface disposed adjacent to the flat rigid surface on the flange, anti-friction rings with flat parallel rigid surfaces disposed between the flat rigid surface on the chamber and the flat rigid surface on the flange to seal one end of the chamber, elastic curved cantilevers peripherally disposed on each anti-friction ring, a cylindrical wall on the apertured disc with an internal surface disposed to co-operate with the elastic cantilevers to limit the speed of rotation of each anti-friction ring, first spring means for pressing the flat rigid surfaces together, second spring means for pressing the flat rigid surfaces apart, a fluid pressure barrier surrounding the shaft adjacent to the stationary anchoring means to seal the other end of the chamber, means for feeding lubricating liquid to the interior of the extendible chamber at a pressure that is automatically maintained in excess of the pressure of the liquid to be restrained, and a stationary casing for supporting the barrier, the anchoring means, the first spring means and the second spring means.

3. Packing means for restraining the flow of liquid along the journal of a rotating shaft comprising a flat-surfaced rigid flange mounted on the shaft, a longitudinally extendible chamber surrounding the shaft, a stationary anchoring means for one end of the chamber, a flat-surfaced rigid apertured disc mounted on the free end of the chamber with its flat rigid surface disposed adjacent to the flat rigid surface on the flange to seal one end of the chamber, first spring means for pressing the flat rigid surfaces together, second spring means for pressing the flat rigid surfaces apart, adjusting means for the springs to provide elastic means for controlling the pressure acting on said surfaces, a fluid pressure barrier surrounding the shaft adjacent to the stationary anchoring means to seal the other end of the chamber, means for feeding lubricating liquid to the interior of the extendible chamber at a pressure that is automatically maintained in excess of the pressure of the liquid to be restrained, and a stationary casing for supporting the barrier, the anchoring means, the first spring means and the second spring means.

4. Packing means for restraining the flow of liquid along the journal of a rotating shaft comprising a flat-surfaced rigid flange mounted on the shaft, a longitudinally extendible chamber surrounding the shaft, stationary anchoring means for one end of the chamber, a flat-surfaced rigid apertured disc mounted on the free end of the chamber with its flat rigid surface disposed adjacent to the flat rigid surface on the flange to seal one end of the chamber, first spring means for pressing the flat rigid surfaces together, second spring means for pressing the flat rigid surfaces apart, a fluid pressure barrier surrounding the shaft adjacent to the stationary anchoring means to seal the other end of the chamber, means for feeding lubricating liquid to the interior of the extendible chamber at a pressure that is automatically maintained in excess of the pressure of the liquid to be restrained, a stationary casing for supporting the barrier, the anchoring means, the first spring means and the second spring means, a lateral flange on the member providing the stationary flat surface, said flange being disposed between the first spring means and the second spring means and mounted in an adjustable housing to provide elastic means for controlling the pressure acting on said surfaces.

5. A thrust bearing comprising a non-rotary element having a flat rigid surface with a cylindrical extension, a rotating shaft having a collar with a flat rigid surface facing and parallel to said flat surface of said non-rotary element, an antifriction ring with flat parallel rigid surfaces located within the cylindrical extension between the flat rigid surface on the collar of the shaft and the flat rigid surface of the non-rotary element, and centrifugally responsive means on the periphery of said antifriction ring to co-operate with said cylindrical extension, thereby limiting the speed of rotation of said anti-friction ring.

6. A thrust bearing comprising a non-rotary element having a flat rigid surface with a cylindrical extension, a rotating shaft having a collar with a flat rigid surface facing and parallel to said flat surface of said non-rotary element, a plurality of flat parallel rigid-surfaced antifriction rings positioned side-by-side within said cylindrical extension between the flat rigid surface on the collar of the shaft and the flat rigid surface of the non-rotary element, and centrifugally-responsive means on the periphery of each antifriction ring to co-operate with said cylindrical extension, thereby limiting the speed of rotation of said antifriction ring.

7. A thrust bearing comprising a non-rotary element having a flat rigid surface with a cylindrical extension, a rotating shaft having a collar with a flat rigid surface facing and parallel to the flat surface of said non-rotary element, an antifriction ring with flat parallel rigid surfaces positioned within said cylindrical extension between the flat rigid surface on said collar of the shaft and the flat rigid surface of said non-rotary element, and elastic curved cantilevers peripherally disposed on said antifriction ring to co-operate with the surface of said cylindrical extension, thereby limiting the speed of rotation of said antifriction ring.

8. A thrust bearing comprising a non-rotary element having a flat rigid surface with a cylindrical extension, a rotating shaft having a collar with a flat rigid surface facing and parallel to the flat rigid surface of said non-rotary element, a plurality of flat parallel rigid-surfaced antifriction rings positioned side-by-side within said cylindrical extension between the flat rigid surface on the collar of said shaft and the flat rigid surface on said non-rotary element, and elastic curved cantilevers peripherally disposed on said antifriction ring to co-operate with the surface of said cylindrical extension, thereby limiting the speed of rotation of said antifriction ring.

ARTHUR RONALD TRIST.

REFERENCES CITED

The following references are of record in the file of this patent:

UNITED STATES PATENTS

| Number | Name | Date |
| --- | --- | --- |
| 660,399 | Shepard | Oct. 23, 1900 |
| 1,859,039 | Joyce | May 17, 1932 |
| 2,048,581 | Weiher | July 21, 1936 |
| 2,127,591 | Evans | Aug. 23, 1938 |
| 2,260,490 | Stelzer | Oct. 28, 1941 |
| 2,539,287 | Trist | Jan. 23, 1951 |